United States Patent [19]
Paez

[11] Patent Number: 5,836,550
[45] Date of Patent: Nov. 17, 1998

[54] MECHANISM FOR STREAMWISE FOWLER DEPLOYMENT OF THE WING TRAILING OR LEADING EDGE

[75] Inventor: Carlos A. Paez, Creve Coeur, Mo.

[73] Assignee: Boeing Company, St. Louis, Mo.

[21] Appl. No.: 757,145

[22] Filed: Nov. 27, 1996

[51] Int. Cl.[6] .............................. B64C 9/04; B64C 9/28; B64C 13/28
[52] U.S. Cl. .......................... 244/214; 244/216; 244/219
[58] Field of Search .................................. 244/198, 201, 244/213, 214, 215, 216, 219

[56] References Cited

U.S. PATENT DOCUMENTS

| | | | |
|---|---|---|---|
| 2,158,676 | 5/1939 | Engelhardt | 244/216 |
| 2,218,114 | 10/1940 | Kunze | 244/216 |
| 2,246,116 | 6/1941 | Wagner et al. | 244/216 |
| 2,278,562 | 4/1942 | Raymond | 244/216 |
| 2,524,605 | 10/1950 | Servanty | 244/216 |
| 2,670,909 | 3/1954 | Replogle | 244/216 |
| 4,470,569 | 9/1984 | Shaffer et al. | 244/214 |
| 5,651,543 | 7/1997 | Arena | 244/216 X |

*Primary Examiner*—William Grant
*Attorney, Agent, or Firm*—Veo Peoples; J. William Stader; Peoples & Hale

[57] ABSTRACT

The invention is a mechanism for the streamwise deployment of an aircraft trailing or leading edge flap. The mechanism connects the spar and flap. There are a pair of swivel links which pivotally connect the spar to the flap. There are also a pair of slaving mechanisms which rotationally connect the spar to the flap by spherical bearings. A linear flap actuator initiates the combined pivotal and rotational action from the spar which translates into a single downward and rearward motion of the flap.

5 Claims, 5 Drawing Sheets

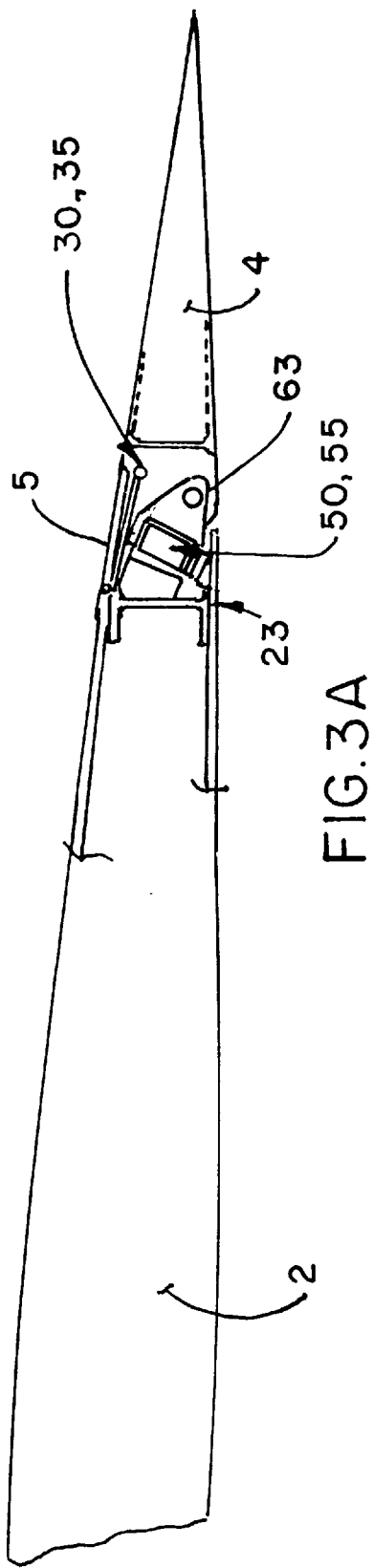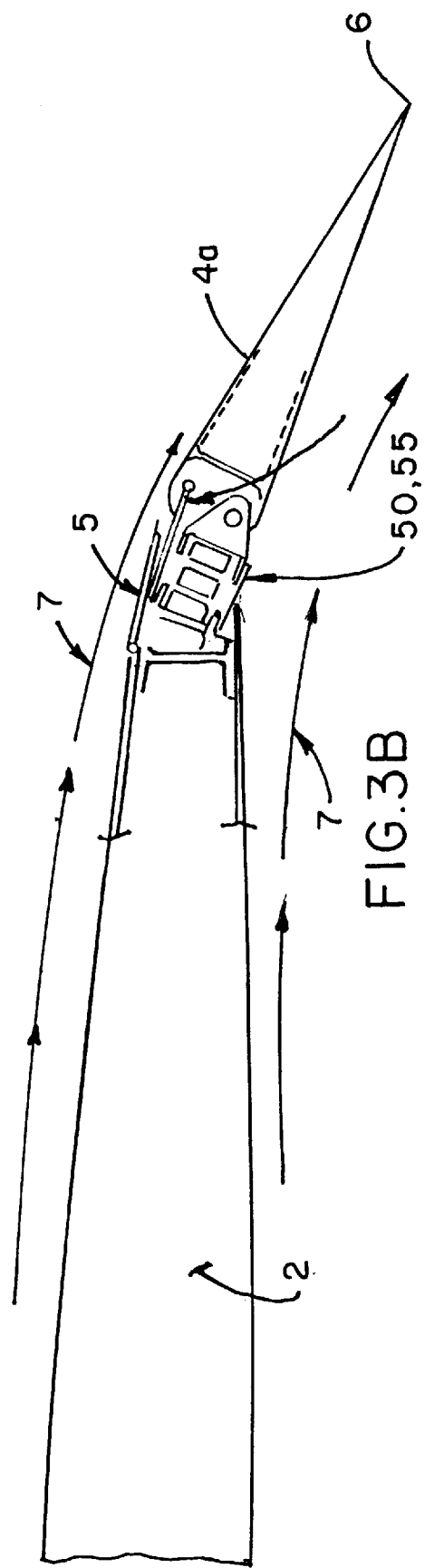

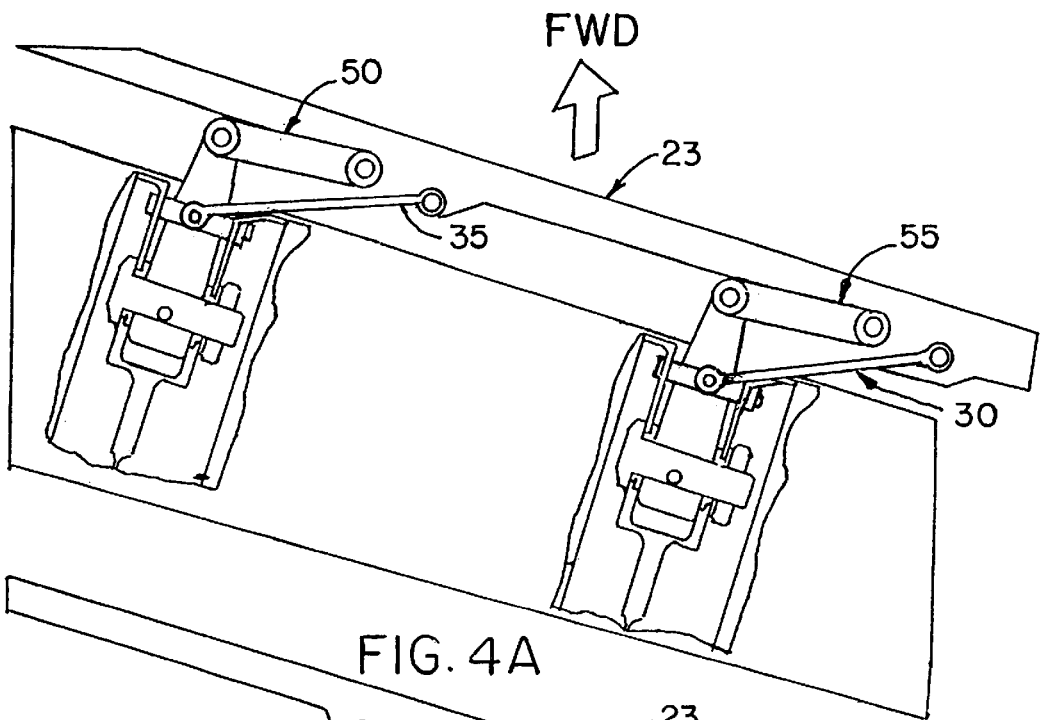
FIG. 4A
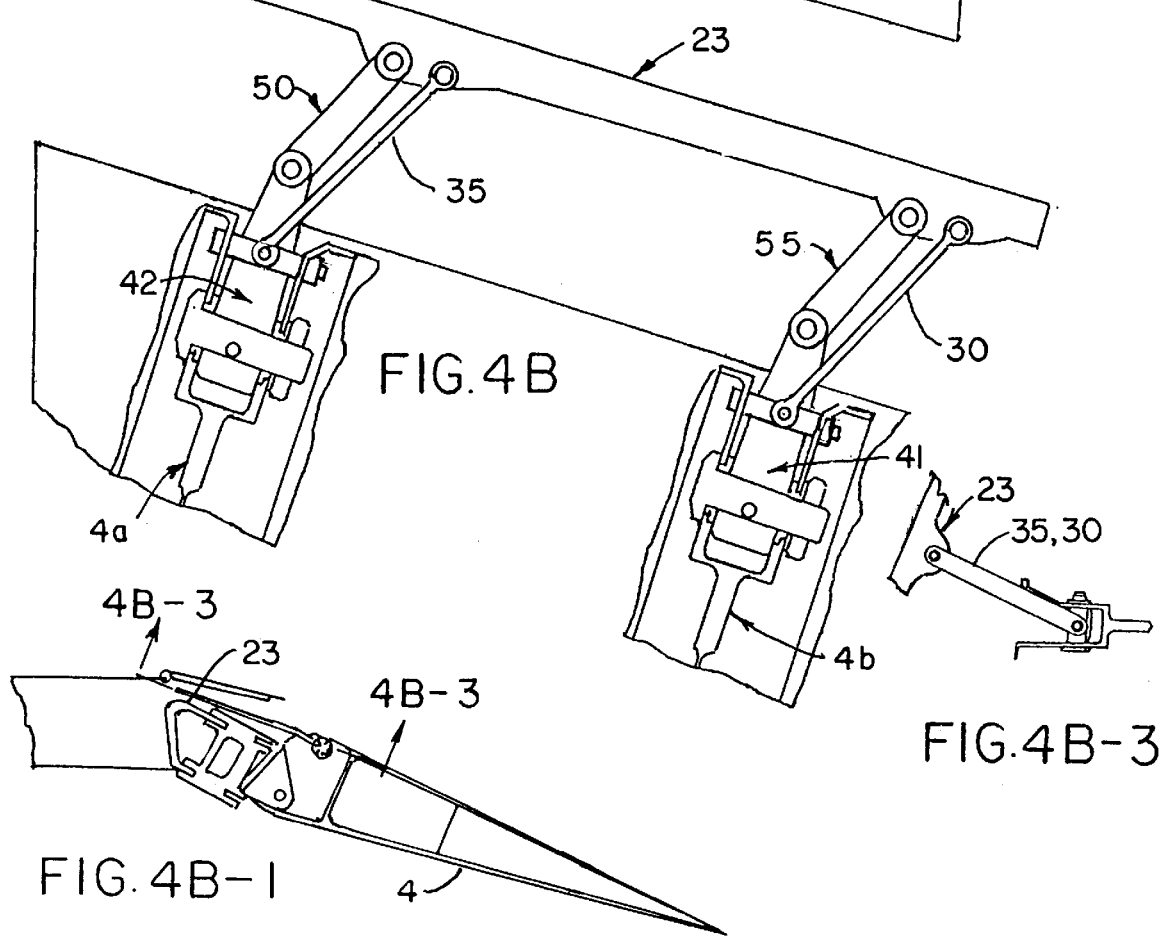
FIG. 4B
FIG. 4B-1
FIG. 4B-3

MECHANISM FOR STREAMWISE FOWLER DEPLOYMENT OF THE WING TRAILING OR LEADING EDGE

BACKGROUND OF INVENTION

1. Field of Invention

This invention relates to the field of actuating and controlling the motion of a flap on the wing of an aircraft, particularly, the "Fowler"-type rearward, downward and rotational movement.

2. Description of Prior Art

Flaps on aircraft wings serve a variety of purposes including, for example, an increase in wing lift. This particularly important function of the flap is served by its extending rearward and downward from the wing in the so-called "Fowler"-type motion. "Fowler"-type motion creates an increase in the curvature or camber of the wing which increases the co-efficient of lift. It is desired that the deployment of the flaps, together with the mechanisms for actuating and controlling the "Fowler"-type motion, impart as little drag resistance as possible while the aircraft is cruising.

Both commercial and military aircraft currently employ flap actuating mechanisms that must simultaneously move the flap and structurally support it. This typically is accomplished by a system of tracks and/or cumbersome sets of linkages. These flap drive systems also include a complex gear and motor system.

There are several drawbacks to the above-described systems. Specifically, the rate at which motion is actuated by a motor and gear system is a restrictive factor limiting useful deployment of the flaps to the proximate time of landing or taking-off. While this limitation is quite acceptable for ground-based landings, it is problematic for carrier-based landing and take-off which often occur so abruptly that the rate of speed of flap deployment and retraction poses greater safety risk than desired.

Another drawback is that the current tracks and linkages employed to extend and support wing flaps create a disturbance in the airflow around the wing and flap resulting in what was heretofore considered a necessary but added drag and inefficiency. This is illustrated in FIGS. 5A and 5B. The air-flow 102 is disturbed when moving around the linkages 100 and 104 used to deploy the flap 103.

A third drawback is the complexity and cumbersomeness of the existing motor and gear systems. This is illustrated in FIG. 5A. From an operations and maintenance standpoint, the multiplicity of working parts which must function together results in a plethora of mechanical elements, the failure of any one of which could endanger the safety of the flap's operation.

An additional drawback is that, currently, the flap moves in two stages. First, as seen in FIG. 5A, the flap is moved fore and aft along a track 100, then the flap is pulled up and down by a separate linkage 104.

A final drawback is the number of linkages extending between the forward or rear spar (supporting beams 106, FIG. 5A) of the wing and the flap. The greater the number of such linkages, the greater the so-called 'free play' or wing flutter at the tip of the flap. Free play occurs as a consequence of any slight movement in any of such linkages which may arise because of the slight design tolerances in each linkage. In an individual linkage such tolerance may be inconsequential; however, the collective tolerances of the linkages, many of which are interlocked to each other, geometrically magnify the movement into a significant factor in flight stability.

The following patents illustrate the current state of the prior art.

U.S. Pat. No. 2,218,114. This approach utilizes several mechanisms to extend and rotate the flap. The device increases the wing chord length and has a fixed rotational angle. This concept is heavier due to weight which is the result of the many parts required.

U.S. Pat. No. 2,246,116. This approach essentially translates the flap via a four-bar mechanism parallel to the airfoil upper moldline. A slight flap rotation is also derived by a link (item 9 of said invention). This link is fastened to the pivot arm (item 4). The flap torsional moments could only be reacted by item 4 with increased relative size over that depicted in the disclosure due to its limited shown size. If the size is increased, then fit and function are compromised.

U.S. Pat. No. 2,282,516. This design approach utilizes external (outside of the outer wing moldline) hinges (item 51) to support the flap (item 3), thus interfering with the air-flow.

U.S. Pat. No. 2,407,401. This invention uses nine links or mechanical devices to control the motion of the flap. The large number of joints would tend to increase "free play" or flutter of the control surface. This, in turn, would have adverse effects on trailing edge flutter, a very difficult item to correct with so many joints.

U.S. Pat. No. 3,203,647. This invention uses two steps to move the wing, increasing its complexity. First, a pivoted bracket (item 126) rotates the flap back, then a piston pushes the flap downward.

U.S. Pat. No. 3,756,089. This invention is essentially a method to rotate a simple flap within a narrow space. It does not have a "Fowler-like" motion (move aft, down and rotate the trailing edge down).

U.S. Pat. No. 4,405,105. This invention utilizes two sets of control arms (or four linkages per support point) to drive the main flap and the auxiliary flap. The design requires an external wing outer mold line fairing to house these linkages and additional overcentering devices, push rods and other mechanisms.

U.S. Pat. No. 4,470,569. This invention deals with a locking mechanism. It utilizes a conventional shaped track to support the slat. The locking mechanism does not react flight loads; this is done by the slat track. This invention has complex tracks, rollers and a drive mechanism. Flap motion and locking is performed by the drive cylinder.

OBJECTS OF THE INVENTION

It is an object of the present invention to provide an improved flap movement mechanism that is capable of a Fowler-like motion with reduced weight or size.

It is a further object of the present invention to provide a flap movement mechanism with improved control and efficiency.

It is a further object of the present invention to provide a flap movement mechanism without tracks and thus substantially reduced interference with the airflow around the wing.

It is a further object of the present invention to provide a flap movement mechanism which negates the need for complex and cumbersome gears and motors.

It is a further object of the present invention to provide a faster mechanism for both deployment and retraction to offer aircraft greater operational flexibility and safety, particularly for carrier-based aircraft.

It is a further object of the present invention to provide an improved flap movement mechanism with a reduced number of linkages so as to minimize 'free play' or wing flutter.

It is a further object of the present invention to provide a flap movement mechanism with fewer working parts and thus reduced operational and maintenance risks.

SUMMARY OF THE INVENTION

The present invention is an apparatus which overcomes the deficiencies in the prior art.

The present invention consists of a mechanism which connects an angled leading edge, or rear-edge spar to the flap of an aircraft wing. Extending from the spar (directly in one case and indirectly in the second case) are two swivel linkages which each rotationally engage a spar support fitting. The spar support fittings, in turn, engage the flap. Also connecting the flap to the spar are a pair of slaving mechanisms. Each slaving mechanism comprises a bar attached to the spar by a spherical bearing, at one end of the bar, and attached to the flap by way of a slotted bolt. The flap is actuated by a linear actuator with one end fixed to the spar and the other attached to the flap. When the actuator is operated, movement of the flap is initiated quickly in a single stage stream-wise Fowler-like manner.

BRIEF DESCRIPTION OF THE DRAWINGS

FIG. 1C-2 is a side view (without the flap mechanism) which illustrates the spoiler deployed and flap in a stowed position.

FIG. 1C-3 is a side view (without the flap mechanism) which illustrates the flap deployed in a downward, rearward manner with the spoiler deflected down to create a "curved" upper surface and a "nozzle" between wing and flap.

FIG. 2 illustrates a perspective, partial cut-away view of the present invention.

FIG. 3A illustrates the same side view as FIG. 1C-1 but showing the swivel link and mechanisms of FIG. 2.

FIG. 3B illustrates the same side view as FIG. 1C-3 but showing the swivel link and mechanism of FIG. 2.

FIGS. 4A and 4B illustrate an overhead view of the swivel link and slaving mechanism when the flap is first stowed and then deployed downward.

FIG. 4B-1 illustrates a side view of the stowed flap.

FIG. 4B-3 illustrates an overhead view along 4B-3⇆4B-3 of the swivel link and slaving mechanism when the flap is in a partially deployed position.

DETAILED DESCRIPTION OF THE INVENTION

Figure 1A:
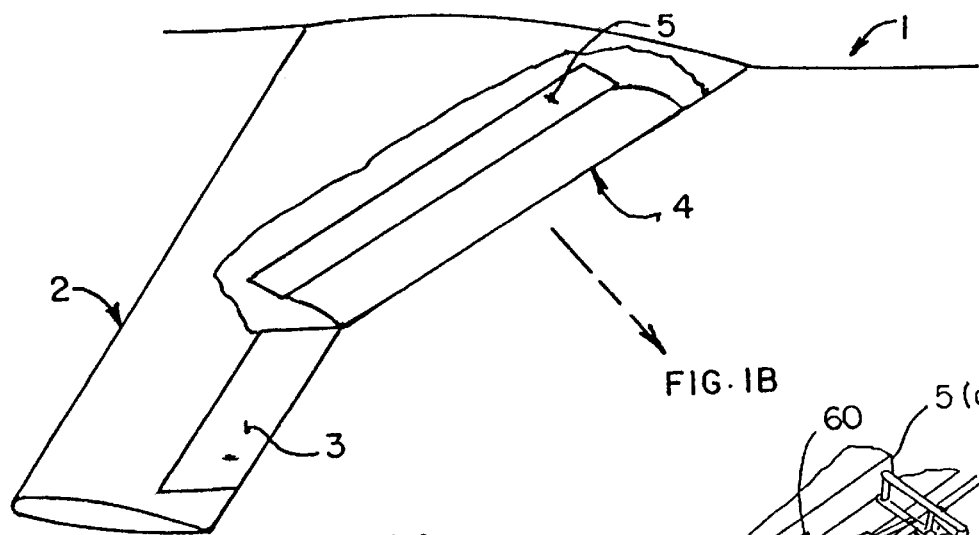
FIG. 1A is a perspective view which illustrates the general location of a trailing edge flap embodying the present invention.
Figure 1B:
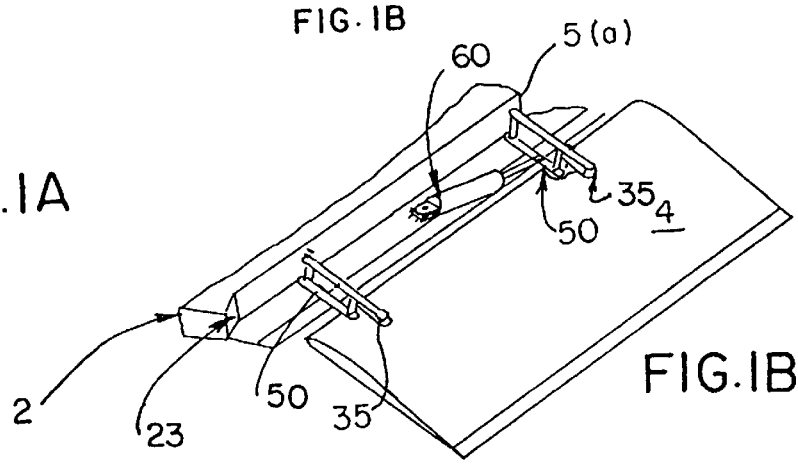
FIG. 1B is a perspective view which illustrates general elements of the present invention.
Figures 1, 1C:
FIG. 1C-1 is a side view (without the flap mechanism) which illustrates the flap in an up and stowed position.
Figures 1, 1C, 2:
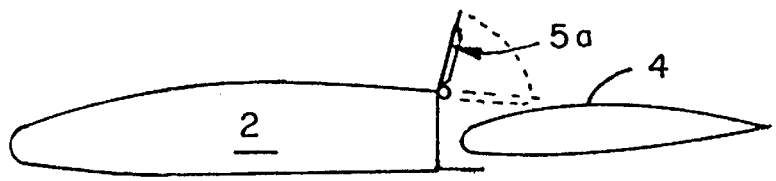
Figures 1, 1C, 2, 3:
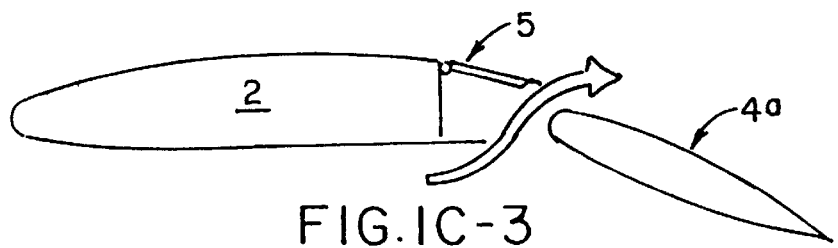

Referring generally to FIGS. 1A through 4, the invention is denoted generally assembled as 10 (FIG. 2). The wing 2 has a rear I-beam or spar 23 (see FIGS. 4A and 1B), spoiler 5 (FIGS. 3B and 1A–1C-3) and a flap 4. Connecting the flap 4 to the rear spar 23 are two slaving mechanisms 30 and 35, respectively. Also connecting the flap 4 to the rear spar 23 are two swivel links 50 and 55, respectively. The linear flap actuator 60 moves the flap 4 to a rearward and downward position via swivel links 50 and 55, and the slaving mechanisms 30 and 35. This occurs in a single motion as opposed to prior art moving the flaps rearward on tracks by one motion, and then moving the flaps downward via linkages in a second motion. The precise elements responsible for the single motion are reviewed in greater detail below.

The flap 4 is an integral component of an aircraft wing 2. Also located on the wing 2 is the aileron 3. The aircraft wing 2 is attached to the fuselage 1 of the aircraft. Connecting the flap 4 to the wing 2 and the aileron 3 is the present invention 10.

The precise component of invention 10 which interfaces with the wing 2 is the wing rear spar 23. To improve the curvature or camber when flap 4 is deployed from wing 2, the rear spar 23 is angled at its top flange at about 20° from an otherwise perpendicular position. See FIG. 2.

The rear flap 4 is engaged with swivel link 50 and slaving mechanism 35 at a first flap-rib 4(a). Parallel to and spaced apart from first flap-rib 4(a) is a second flap rib 4(b) where swivel link 55 and slaving mechanism 30 engage flap 4. The flap ribs 4(a) and 4(b), at the point of engagement of their respective swivel links and slaving mechanisms, are defined by a cavity (a) in flap-rib 4(a) and a cavity (b) in flap-rib 4(b) where the swivel link 50 and slaving mechanism 35 are engaged at (a) and swivel link 55 and slaving mechanism 30 are engaged at (b). In a direction perpendicular to cavities (a) and (b) on flap-ribs 4(a) and 4(b), respectively, are upper holes $a_1$ and $b_1$ opening into said cavities, for aligning and rotatably receiving slotted slaving-bolts 31 and 36, respectively. Immediately underneath $a_1$ and $b_1$ on flap-ribs 4(a) and 4(b) are lower holes $a_2$ and $b_2$, respectively, which also open perpendicularly into channels (a) and (b), respectively, in order to rotatably receive bolts 83 and 84 and their respective matching bushings 82 and 85.

The engagement of swivel links 50 and 55 in slots (a) and (b), respectively, is by way of flap support fittings 42 and 41, respectively. The engagement of slaving mechanisms 35 and 30 in slots (a) and (b), respectively, is by way of slotted slaving-bolts 31 and 36, respectively.

Figure 2:
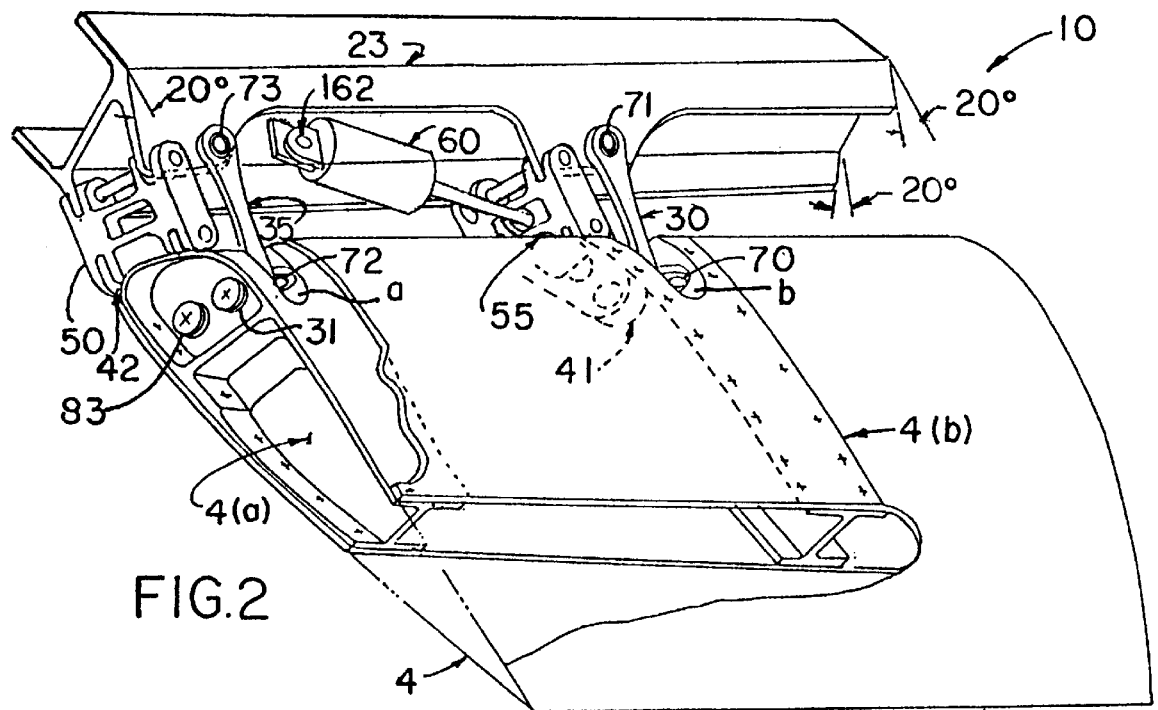
Figure 2A:
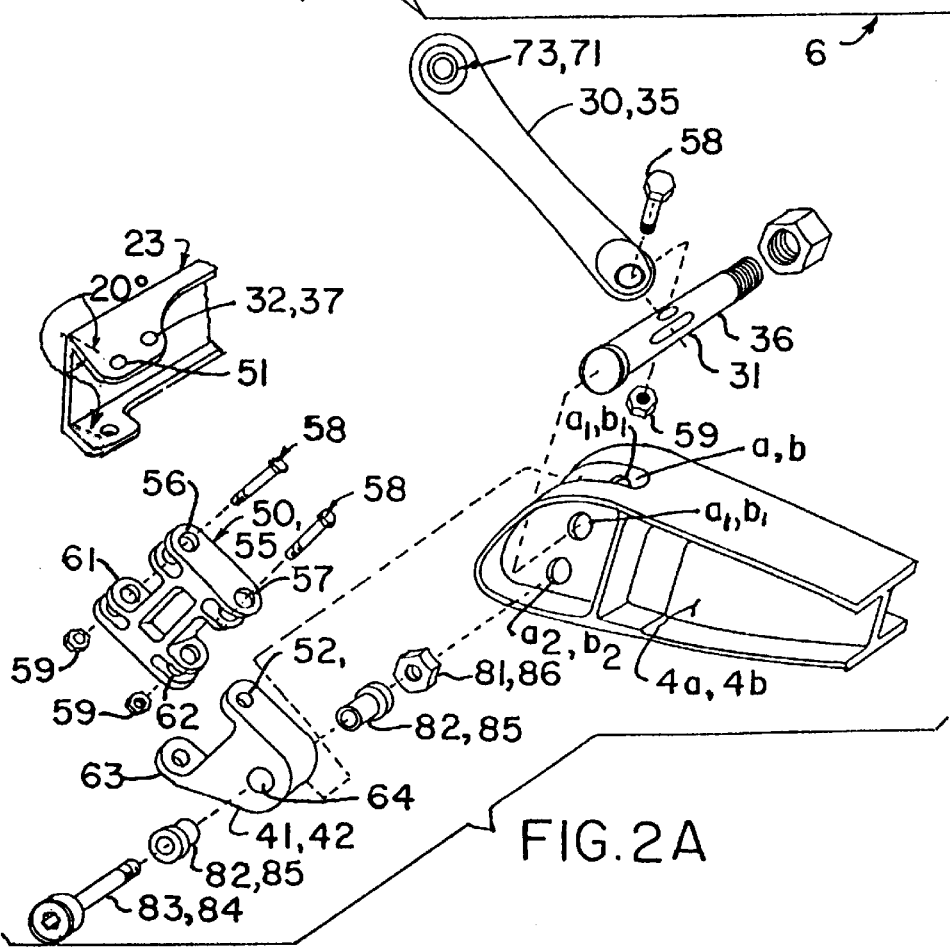
FIG. 2A illustrates an exploded view of swivel link and slaving mechanisms from FIG. 2.

Linear flap actuator 60 is linearly affixed to the spar 23 at one end and engages swivel link 55 at the other end. Referring particularly to FIGS. 2 and 2A, the linear flap actuator 60 is configured to include a piston portion at one end and a rod portion at the other end. The piston portion includes a piston in a cylinder, with a rod being connected to the piston and extending from the cylinder to form the rod portion. In the exemplary embodiment, the wing rear spar is configured generally as an "I-beam" having a central web with essentially parallel upper and lower flanges extending from the web at an angle off 20° from perpendicular to the web, such that the upper or top flange is at an angle of about 70° from the web, while the lower or bottom flange is at an angle of about 110° from the web. The piston portion of the actuator is attached to the web of the spar by way of an end bracket 162. The rod portion is configured to pivot swivel link 55 relative to spar 23 through use of conventional fittings in a manner not shown.

Swivel link 55 includes holes 56 and 61 with slots therebetween, the slots receiving the top and bottom flanges of wing spar 23, with holes 56 and 61 being aligned with corresponding holes in the top and bottom flanges. One of a plurality of bolts numbered as 58 extends through said holes, said top and bottom flanges and said slots to hingedly attach the swivel link to the spar. Accordingly, the actuator can be activated by electronic and/or hydraulic physical means to serve as the prime mover for pivoting swivel link 55 and ultimately driving flap 4 rearward and downward in a single motion. There is a rounded triangular shaped flap support fitting 41 which hingedly engages with swivel link 55 by way of engaging slots defined at holes 57 and 62 of said swivel link 55 with holes 52 and 63 of said fitting 41, through which holes another of bolts 58 extends. Nuts 59 secure bolts 58. An apex end of triangular flap support fitting 41 has an opening 64 which is aligned with $b_2$ to receive bushings 82 and matching bolt 83 which are secured by nut 81. This apex end of support fitting 41 slides into cavity (b) of flap rib 4(b) so as to pivot up or down while rotating around the axis of bolt 83 when actuator 60 moves flap 4 rearward. Said rotation of fitting 41 is in intimate contact with slotted slaving bolt 36, thus limiting undue "play" in said rotation. Another bolt 58 secures the slaving arm of slaving mechanism 30 to slotted slaving bolt 36. A spherical bearing 71 rotatably engages said slaving arm to the top flange of spar 23 at a point adjacent to the spar 23 pivotal engagement with swivel link 55. Thus, the slaving mechanism responds to either inward or outward movement of actuator 60 by a rotation action, while the swivel link 55 responds by translating its rotation into either a downward or upward pivot of support fitting 41. Slaving mechanism 35, spherical bearing 73, slotted bolt 31, support fitting 42, and swivel link 50 are similarly connected to mirror the action of their above-described corresponding mechanisms, bearings, bolts, fittings, and links, except that swivel link 55 connects to actuator 60, whereas swivel link 50 does not. Top holes 56 engage the angled top flange of spar 23 with hole 51 of said spar 23 to receive bolt 58, while hole 32 on the top flange of spar 23 accommodates spherical bearing 73 and slaving mechanism 35, where spar 23 top flange hole 37 accommodated slaving mechanism 30.

The use of spherical bearings 73 and 71 allows the slaving mechanisms 35 and 30 to rotate even though misaligned at their points engagement with spar 23, as opposed to a regular hinge which would not operate if misaligned at engagement. Also, the amount of camber may be controlled by altering the displacement length of the flap actuator 60. The use of linear flap actuator 60 having a piston-like action allows for a faster response than do conventional gear and motor systems.

FIGS. 4A and 4B illustrate the cooperative motion of swivel links 50 and 55 with slaving mechanisms 30 and 35 in relation to the deployment of flap 4. The flap actuator 60 is not shown in order to afford clarity in viewing and discussing the interaction between the swivel links and the slaving mechanisms with the flap. Swivel links 50 and 55 and slaving mechanisms 35 and 30 are viewed overhead together with the flap 4 in FIGS. 4A and 4B. The flap 4 and one of said links and said slaving mechanism are viewed from the side in FIG. 4B-1.

In FIG. 4A, flap 4 is in the stowed position, which is roughly level with the wing, and the swivel links 50 and 55 are parallel to the face of rear spar 23. The slaving mechanisms 30 and 35 are positioned at an angle other than parallel.

Figure 5A:
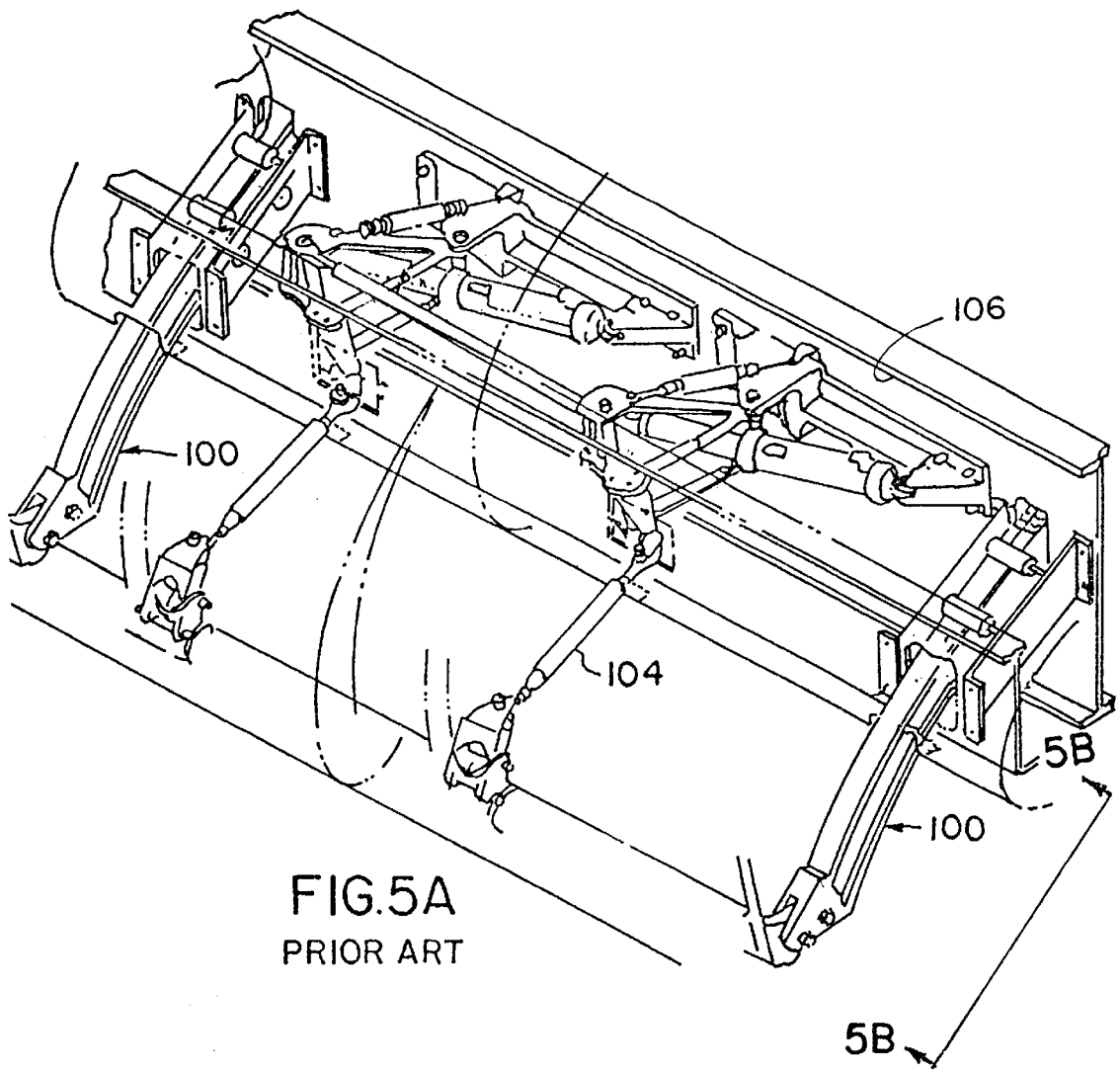
FIG. 5A is a cut-away perspective view of a typical prior wing and flap movement assembly.
Figure 5B:
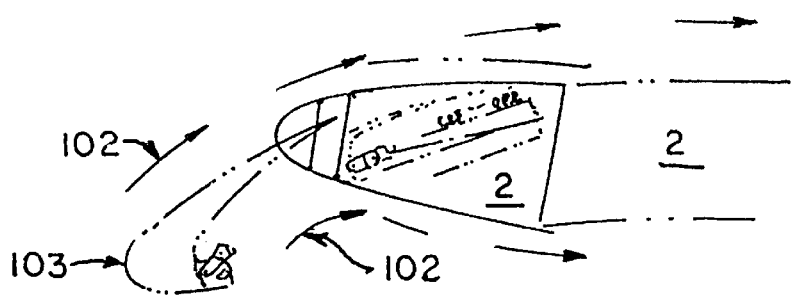
FIG. 5B is a side view from a prior art FIG. 5A type deployment illustrating the air flow on a typical prior art wing and flap assembly.

In FIG. 4B, the flap 4 is partially deployed and the swivel links 50 and 55 and slaving mechanisms 30 and 35 have rotated outward from the face of spar 23. Note that flap 4 has started to separate from the wing spar 23 and, as can be seen in corresponding FIG. 3B, the trailing edge 6 has moved downward. Now viewing FIG. 3B, it is possible to observe the entire curvature of the wing 2 and deployed flap rib 4(a). The airflow 7 is capable of passing over and under the wing 2 and deployed flap rib 4(a) without disruption. When this flow is compared to the airflow of the prior art 102 on FIG. 5b, the advantages of the present invention can be seen to be smoother and with less interference.

This device may also be used for a leading edge flap by merely reversing the flap 4 position to the leading edge for a forward spar.

It will be obvious to those skilled in the art that various changes may be made without departing from the scope of the invention and the invention is not to be considered limited to what is illustrated in the drawings and described in the specification. For instance, the slaving link may be positioned on the under surface of the flap and flap support fitting 41, 42 and mounting hole 64 moved to the upper region of the flap.

What is claimed is:

1. A mechanism for deploying a flap, comprising
    a. a spar of a wing;
    b. a flap connected to said spar by
        1. two swivel links, each being hingedly connected at one end to said spar and at an opposite end to a respective one of two flap support fittings, each said flap support fitting being pivotally hinged to the flap; and
        2. two slaving mechanisms, each corresponding to a single swivel link and being rotationally connected to the spar at one end by a spherical bearing and to the flap at an opposite end by being engaged in a slotted slaving bolt; and
    c. a linear flap actuator connected to the spar at one end and to one of the two swivel links at the other end for pivoting the one link, causing pivoting of the other link, pivoting of the two flap support fittings and rotation of the two slaving mechanisms, for moving the flap in a streamwise Fowler motion in a single action.

2. The mechanism of claim 1, wherein the spar is a rear spar and the flap is a trailing edge flap.

3. A mechanism for deploying a trailing edge flap rearward and downward in a streamwise Fowler manner, comprising:
    a. a first swivel link with a first flap support fitting, said first swivel link being pivotally attached to a wing rear spar flange, said first flap support fitting being pivotally attached to a first flap rib; and
    b. a second swivel link with a second flap support fitting, said second swivel link being pivotally attached to the said rear spar flange and a linear flap actuator, said second flap support fitting being pivotally attached to a second flap rib; and
    c. said linear actuator having a first piston end and second rod end, the first piston end being affixed to a wing rear spar web surface and the second rod end being pivotally connected to said second swivel link; and
    d. a first slaving mechanism rotationally affixed at one end to the flap by a first slotted slaving bolt and at an opposite end connected to the wing rear spar flange by a spherical bearing; and
    e. a second slaving mechanism rotationally affixed to the flap by a second slotted slaving bolt and to the wing rear spar flange by a second spherical bearing;

whereby extension of the linear actuator pivots the first swivel link and second swivel link, and rotates the first slaving mechanism and second slaving mechanism, thus moving the trailing edge flap in a downward motion and rearward motion simultaneously, while the slaving mechanisms rotate the flap about the longitudinal axis of the respective slaving bolt.

4. The mechanism as described in claim 3, wherein the wing rear spar flange is angled at 20 degrees less than perpendicular from said wing rear spar web surface.

5. The mechanism as described in claim 4, wherein said wing rear spar flange is a wing rear spar upper flange, and further comprising a wing rear spar lower flange, the linear actuator being affixed to said wing rear spar web surface between said wing rear spar upper and lower flanges, whereby the linear actuator does not interfere with air flow over or under the flap, such that air flows smoothly over the flap.

* * * * *